United States Patent [19]

Goldsmith

[11] Patent Number: 4,568,442

[45] Date of Patent: Feb. 4, 1986

[54] GAS DIFFUSION COMPOSITE ELECTRODE HAVING POLYMERIC BINDER COATED CARBON LAYER

[75] Inventor: Charles E. Goldsmith, Baton Rouge, La.

[73] Assignee: The Dow Chemical Company, Midland, Mich.

[21] Appl. No.: 697,194

[22] Filed: Feb. 1, 1985

[51] Int. Cl.$^4$ .................. C25B 11/04; H01M 4/86
[52] U.S. Cl. ............................. 204/284; 204/290 R; 204/294; 502/101; 429/42; 429/45; 264/43; 264/44; 264/61; 156/77
[58] Field of Search ............... 204/284, 290 R, 292, 204/294; 502/101; 429/42, 45; 264/43, 44, 61; 156/77

[56] References Cited

U.S. PATENT DOCUMENTS 4,370,284  1/1983  Solomon ..................... 264/42

*Primary Examiner*—John F. Niebling
*Attorney, Agent, or Firm*—James H. Dickerson, Jr.

[57] ABSTRACT

A gas diffusion composite electrode useful in an electrochemical cell comprising an electrochemically active layer and a backing layer, said active layer characterized as porous, homogeneous, hydrophilic, and electrolyte-permeable and comprising a sintered mixture of a major amount of an electrically conductive, hydrophilic, particulate material containing admixed therewith an electrochemically active catalyst, and a minor amount of a hydrophobic polymer, said particulate material being substantially coated with said hydrophobic polymer by precipitation of said hydrophobic polymer upon said particulate material.

23 Claims, No Drawings

GAS DIFFUSION COMPOSITE ELECTRODE HAVING POLYMERIC BINDER COATED CARBON LAYER

BACKGROUND OF THE INVENTION

1. Field of the Invention

This invention relates to electrochemical cells such as fuel cells or electrolytic cells, particularly chlor-alkali electrolytic cells utilizing air or oxygen depolarized cathodes.

2. Description of the Prior Art

Electrodes for use in electrochemical cells, particularly air or oxygen diffusion cathodes for use in chlor-alkali electrolytic cells which are based upon carbon in combination with wetproofing agents such as polytetrafluoroethylene, are subject to failure as the result of the excessive wetting of the electrochemically active hydrophilic portion of the electrode by the electrolyte. This excessive wetting is often partially counteracted by laminating the electrochemically active layer to a porous, hydrophobic (backing) layer. The pores of the hydrophobic layer pass air or oxygen so as to make the air or oxygen available to the electrochemically active layer of the electrode.

The air or oxygen gas diffusion cathode in a chlor-alkali electrolysis cell is more energy efficient than a cathode which does not pass air or oxygen gas to effect depolarization since in diffusion electrodes the unwanted by-product (hydrogen) in the electrolysis of an alkali metal halide is eliminated. The air or oxygen diffusion cathodes not only eliminate the production of hydrogen at the cathode but force the formation of desirable hydroxide ions.

It is known to form electrochemically active layers in an electrode, particularly a cathode for a chlor-alkali electrolysis cell utilizing as an active component an electrically conductive carbon black. The tendency of the electrically conductive carbon black to be wetted by the electrolyte must be controlled within limits in order to provide an electrode with a reasonable period of usefulness. The efficiency of the carbon black active layer is reduced during operation of the cell as the pores of the carbon black become completely wet out by the electrolyte since the air or oxygen necessary for depolarization of the active layer of the electrode does not under complete wetting conditions penetrate to the active portion of the electrode so as to effect depolarization.

Prior art carbon-based hydrophilic electrolyte-active layers of air or oxygen depolarized electrodes have been rendered less susceptible to wetting by the electrolyte by blending a hydrophobic polymer such as polytetrafluoroethylene with carbon to impart hydrophobicity to the carbon and thus increase the useful life of the electrode. It is thus common to employ mixtures of carbon black and polytetrafluoroethylene in particulate form in the preparation of the electrolyte active layer of the electrode. Additionally, a homogeneous, porous, hydrophobic backing layer of polytetrafluoroethylene has been employed in prior art gas diffusion electrodes on the side of the electrode facing away from the electrolyte. In a chlor-alkali electrolytic cell, this side of the gas diffusion electrode is normally in contact with air or oxygen under pressure. Complete wetting of the electrolyte-permeable layer of the electrode tends not to take place as the result of air or oxygen being forced into one side of the electrolyte-permeable layer of the electrode, thus forcing electrolyte away from this side of the electrolyte-permeable layer of the electrode.

Heretofore, these methods of increasing the useful life of gas diffusion electrodes have not been entirely satisfactory and complete wetting of the electrolyte-permeable layer of the electrode ultimately takes place over a relatively short period of time causing failure of the electrode.

In U.S. Pat. No.4,317,789, a method of making porous strips for fuel cell electrodes is disclosed in which carbon powder present in an aqueous dispersion is coated with a binder by precipitating the binder onto the carbon powder and thereafter drying and crushing the precipitate, wetting the powder with a liquid and calendering the wetted powder to obtain the desired porous strips. An example is provided of the use of the porous strip in the preparation of a two-layer electrode for use in a hydrogen-air fuel cell. The second layer of the electrode is a barrier layer which is conductive providing electron transfer from the catalytic layer to the current distributor of the cell. It is noted that the proportion of polytetrafluoro-ethylene binder in the porous strip layer is between 20 and 99 percent and that of the carbon component between 80 and 1 percent. There is no indication in this reference that the binder is sintered as a step in the process for the preparation of the electrode strips.

As a further indication of the state of the art, Solomon, in U.S. Pat. No. 4,456,521, discloses a method of preparing three-layer laminated electrodes suitable for use as oxygen (air) cathodes in chlor-alkali and other electrochemical cells, fuel cells and in other electrochemical applications. The three-layer laminate includes an active layer or sheet containing from about 60 to about 85 percent by weight active carbon, the remainder being unsintered fibrillated polytetrafluoroethylene in intimate admixture with said active carbon. The active layer is laminated on its working surface to a current distributor and on its opposite surface to a porous, coherent, hydrophobic polytetrafluoroethylene-containing wetproofing layer.

SUMMARY OF THE INVENTION

The present invention overcomes the tendency of the prior art gas (air or oxygen) diffusion composite electrodes to flood or wet-out as the electrochemically active, hydrophilic layer of the electrode becomes wet by the electrolyte. Flooding of the electrode occurs as the electrolyte penetrates beyond the hydrophilic layer of the electrode and into a second layer, termed a backing layer, which generally comprises a porous, hydrophobic polymer layer.

In the electrode of the present invention, greater resistance to flooding or wet-out of the electrochemically active layer of the composite electrode is obtained by substantially coating the particles of an electrically conductive, hydrophilic, particulate material, such as carbon black containing admixed therewith an electrochemically active catalyst, with a polymeric binder by mixing these two components with a liquid to form a dispersion and subsequently substantially coating the particulate material by precipitating the polymeric binder onto said particulate material either by chemical or physical means. Thereafter the porous, homogeneous, hydrophilic, electrolyte-permeable layer of the electrode is prepared by drying the mixture of said particulate material and polymeric binder to substantially remove the dispersion medium. Thereafter this mixture is fibrillated by shear blending. After wetting with a liquid dispersion medium the mixture is formed into a cohesive and pliable dough. This dough is pressed into a cake form and subsequently calendered to form a thin sheet. A sheet material characterized as porous, homogeneous, and electrolyte-permeable is obtained which is desirably laminated to a hydrophobic polymer backing sheet containing a pore-forming material. Finally, said sheet material and a hydrophobic polymer backing sheet laminated thereto are sintered preferably under a nitrogen atmosphere and the pore-forming material is removed. The composite electrode can be completed by laminating a current distributor to one side of the hydrophilic sheet material before sintering.

DESCRIPTION OF THE PREFERRED EMBODIMENTS

The present invention is based upon the discovery that the wettability of the hydrophilic layer of a gas (air or oxygen) diffusion electrode, particularly a cathode in a chlor-alkali electrolytic cell, can be substantially reduced without impairing the energy efficiency of the electrode. In addition it has been found that the tensile strength of a hydrophilic layer of a gas diffusion electrode can be substantially increased by combining a major amount of an electrically conductive, hydrophilic, particulate material, such as carbon black, with a minor amount of a hydrophobic polymer dispersion such that the hydrophobic polymer is precipitated upon, so as to substantially coat, said particulate material. Thereafter, the mixture of hydrophobic polymer and particulate material is dried, shear blended and formed into a dough by mixing with a liquid dispersion medium. The dough is then formed into a sheet, such as by calendering. This sheet is laminated to a backing layer of a hydrophobic polymer sheet containing a pore-forming material. Thereafter the sheet(s) are dried and subsequently laminated to a current distributor and sintered at a temperature at or above the sintering temperature of the hydrophobic polymer. The pore-forming material is thereafter removed.

The hydrophilic electrode layer is laminated to a hydrophobic polymer layer containing a pore-forming material and a current distributor prior to completion of the fabrication of a composite electrode of the invention. Preferably the hydrophobic polymer backing layer is electrically non-conductive, therefore necessitating that the current distributor be located on one surface of the hydrophilic layer of the electrode.

The electrically conductive, hydrophilic, particulate material forming a part of the hydrophilic layer of the electrode of the invention can be an electrically conductive, hydrophilic carbon. For example, acetylene black, which has a small particle size and is electrically conductive, can be used. Some other carbon blacks, such as certain furnace blacks, are also electrically conductive and can be used. The carbon used can be porous or non-porous. Generally, carbon blacks having an ultimate particle size ranging from about 0.01 to 0.05 microns, and more usually within the range of about 0.01 to about 0.03 microns are suitable. In a preferred embodiment, acetylene black active carbon particles are used such as are commercially available under the trademark VULCAN TM XC-72 from the Cabot Corporation.

As an electrochemically active catalyst for use as a component of the electrode in a chlor-alkali electrolysis cell, a precious metal catalyst such as silver, platinum, palladium, rhodium, and the like (Group VIII of the periodic table, periods 5 and 6) or metal oxides such as combinations of nickel oxide and lithium oxide can be used. Where the electrode is utilized as an anode in a fuel cell, metals of Groups I-B, V-B, VI-B, and VIII of the periodic table can be used. For instance, chromium, tungsten, molybdenum, cobalt, nickel, silver, copper, platinum, palladium, rhodium, iridium, and other metals such as manganese and inorganic compounds containing one or more of such metals such as nickel oxide, manganese oxide, cobalt molybdate, vanadium pentoxide, and the like can be used. Platinum is especially active as an anode catalyst. Since a fine particle size is desirable, an especially preferred anode catalyst is platinum black. Silver is also a preferred anode catalyst. The catalyst can be obtained in admixture with the carbon by forming a dispersion of the carbon and a compound of the catalyst metal, precipitating the dispersion by filtration, and heating the mixture to thermally decompose the catalyst compound to obtain the catalyst metal. Generally about 2 to about 10 percent by weight, preferably about 2 to about 5 percent by weight of a catalyst metal based upon the total weight of the mixture of carbon and catalyst metal, is used. The catalyst compound can be a compound of silver such as silver nitrate, silver carbonate, silver acetate, or silver citrate. Heating to decompose the catalyst metal can take place at a temperature of about 350° C. for a period of about 4 hours under a nitrogen atmosphere.

A polymeric hydrophobic binder, preferably a thermoplastic halocarbon polymer binder, is utilized in admixture with an electrically conductive, hydrophilic, particulate material comprising carbon black in the preparation of the hydrophilic layer of the electrode. The binder can be utilized as an aqueous dispersion or a dry powder dispersed in an organic liquid to make the ultimate mixtures of carbon black and binder which are to form the blend of components going to make up the hydrophilic layer of the electrode.

If the carbon black is mixed with a halocarbon polymer binder in the form of an aqueous dispersion of said binder, subsequent to formation of the aqueous dispersion of the components, precipitation of the halocarbon polymer binder upon the carbon black can be accomplished by mixing the carbon with the aqueous dispersion of halocarbon polymer binder at a temperature of less than about 18° C., preferably between 12° C. and 15° C., so as to avoid spontaneous precipitation. Precipitation of the halocarbon polymer binder upon the carbon black is thereafter accomplished either by raising the temperature, for instance to about 25° C. to 30° C., or by lowering the pH of the dispersion, such as by adding dilute hydrochloric acid.

If the dispersion of carbon black and hydrophobic polymer binder is prepared in an organic liquid diluent dispersion medium, precipitation is accomplished simply by removing the organic liquid diluent dispersion medium such as by filtration of the dispersion. It has been found important to electrode performance to thoroughly remove the halocarbon polymer binder from the precipitated dispersion of carbon black and halocarbon polymer binder, particularly in the case in which the dispersion is made in the presence of an organic liquid diluent dispersion medium such as a hydrocarbon. Thereafter, the precipitates are shear blended to fibrillate the mixture and then mixed with an organic liquid diluent dispersion medium and calendered to form the hydrophilic layer of the electrode.

The porosity of the hydrophilic layer results from the retention during processing in the carbon black/halocarbon polymer binder mixture of a portion of the organic liquid diluent dispersion medium through the calendering stage of the process. When the calendered sheet is dried at elevated temperatures so as to remove the organic liquid diluent dispersion medium, the electrode sheet becomes porous and this porosity is retained through the sintering step of the process.

While polytetrafluoroethylene is the most preferred polymer for use in the preparation of the electrodes of the invention, if desired, other hydrophobic polymers can be used instead. Preferred hydrophobic polymers are the thermoplastic halocarbon polymers selected from the group consisting of at least one of polymers of tetrafluoroethylene, fluorinated ethylene propylene, copolymers thereof having the moieties ($-CX_1X_2-CX_3CX_4-$) and
($-CY_1Y_2-CY_3Y_4-$), and homopolymers having the moieties ($-CY_1Y_2-CY_3F-$)

wherein $X_1$, $X_2$, $X_3$, $X_4$, $Y_1$, $Y_2$, $Y_3$, and $Y_4$ are selected from the group consisting of fluorine, chlorine, and hydrogen, at least one of said X and Y being fluorine. Preferably the halocarbon polymer is a fluorocarbon polymer selected from the group consisting of at least one of copolymers having an ethylene moiety and a fluorocarbon moiety chosen from the group consisting of ($-CFH-CH_2-$),
($-CF_2-CH_2-$),
($-CF_2-CFH-$),
($-CF_2-CF_2-$), and
($-CH_2-CClF-$).

Suitable hydrophobic polymers can generally include any polymer having a low surface energy which will remain stable under fuel cell or chlor-alkali electrolysis cell operating conditions. Such polymers include polymers of various halogen-substituted hydrocarbon monomers, particularly fluorine-substituted olefinic monomers. Halogen-containing polymers that can be employed include polymers of fluorocarbons and substituted fluorocarbons wherein one or more fluorine atoms are replaced by hydrogen, chlorine, or bromine. Alternative halocarbon polymers include polytrifluoroethylene, polyvinylfluoride, polyvinylidene fluoride, polytrifluorochloroethylene, and copolymers of different fluorocarbon monomers such as copolymers of tetrafluoroethylene and hexafluoropropylene.

In addition to the halocarbon polymers, various other hydrophobic polymers which can be used include hydrocarbon polymers having a molecular weight of 50,000 to 1,000,000 or more, and a free surface energy close to or below that of polyethylene. Representative polymers include polymers and copolymers of ethylene, propylene, 3-ethyl-1-butene, 4-methyl-1-pentene, and 4,4-dimethyl-1-pentene. Silicone polymers are also suitable as hydrophobic polymers for use in the preparation of the electrodes of the invention.

The hydrophilic layer of the electrode is composed of a single homogeneous layer comprising a minor amount of a hydrophobic polymer and a major amount of a hydrophilic particulate material, such as carbon black, wherein the hydrophobic polymer has been precipitated upon the carbon black when present either in an aqueous dispersion or an organic liquid dispersion medium. Generally, the hydrophobic polymer is present in the amount of about 1 to about 20 percent, preferably about 2 to about 15 percent by weight and the hydrophilic particulate material is present in the amount of about 80 to about 99 percent, preferably about 85 to about 98 percent by weight.

The procedure for preparing the electrodes of the invention will be illustrated with polytetrafluoroethylene as the hydrophobic polymer binder and carbon black as the electrically conductive, hydrophilic, particulate material. In preparing the homogeneous, hydrophilic, electrolyte-permeable layer for the electrode of the invention, a hydrophobic polymer, i.e., polytetrafluoroethylene powder is dispersed in a liquid such as an organic liquid diluent dispersion medium, together with carbon black. Generally, the dispersion contains about 1 to about 20 percent by weight of the hydrophobic polymer, i.e., polytetrafluoroethylene, powder, with the remainder being carbon black containing an electrochemically active catalyst. Precipitation of the polytetrafluoroethylene upon the carbon black is accomplished simply by filtering the organic liquid dispersion medium out of the dispersion and drying the mass obtained at an elevated temperature to remove substantially all of the organic liquid diluent dispersion medium. Thereafter the mass is subjected to shear blending and a portion of the organic liquid diluent dispersion medium is added to the dried powder.

In the final steps of the procedure for the preparation of the hydrophilic layer of the composite electrode of the invention, the liquid organic dispersion medium is added to the dry powders in a suitable amount so that a cohesive and pliable dough results. The dough is formed into a cake and the polytetrafluoroethylene component of the dough calendered utilizing successive passes through the calender rolls. As the dough is passed through the closely spaced calender rolls, the spacing between the rolls is reduced at each successive pass so as to ultimately prepare a thin sheet of hydrophilic layer electrode material. Thus the calender rolls initially can be set at between 200 to 300 millionths of an inch with subsequent reductions in the setting to bring the final calendered sheet to a thickness of about 20 to about 30 mils.

Generally, the hydrophilic layer electrode sheet is laminated to (1) a current distributor (also termed current collector) layer such as a $20 \times 20 \times 0.001$ inch or $50 \times 50 \times 0.005$ inch silver-plated nickel metal mesh, and (2) a wetproofing, or backing, layer of a hydrophobic polymer, i.e., polytetrafluoroethylene, which is rendered porous by removal of a pore-forming material so as to allow passage of the gas, i.e., air or oxygen, into the part of the electrode in contact with the electrolyte. Lamination is accomplished while the pore-forming material is present in the backing layer. The metal mesh current distributor generally can be prepared from a metal selected from the group consisting of iron, steel, nickel, platinum group metals and mixtures thereof. Preferably, the metal mesh is prepared from a metal selected from the group consisting of silver or silver-coated nickel, iron, steel, and valve metals. Lamination of the hydrophilic layer to a current distributor layer and a wetproofing, gas-porous, hydrophobic layer can be accomplished by calendering or can take place in a hydraulic press, for instance, at a temperature of about 110 to about 120 degrees centigrade and pressures of about 1.5 to about 8.5 tons per square inch. Generally the current distributor can be laminated to either face of the electrically conductive layers of the electrode. Preferably it forms a layer on the hydrophilic layer of the electrode which is exposed to the electrolyte.

Generally, either an aqueous dispersion of a hydrophobic polymer or an organic liquid diluent dispersion medium is used in the preparation of the hydrophilic layer of the electrodes of the invention. The aqueous dispersion of the polytetrafluoroethylene polymer can be an aqueous dispersion having about 60 percent solids. Preferably an aliphatic or aromatic hydrocarbon or mixtures thereof which are normally liquid at the temperatures is utilized in making the dispersions using an organic liquid. Representative aliphatic hydrocarbons include pentane, hexane, heptane, and octane. Representative aromatic hydrocarbons which are useful in preparing the polytetrafluoroethylene/carbon dispersions include benzene, toluene, xylene, cycloaliphatic hydrocarbons such as cyclohexane, low, medium, and high boiling mineral oil fractions which can contain mixtures of aliphatic hydrocarbons, naphthenes, and aromatic hydrocarbons. The organic liquid diluent dispersion medium can be a halogenated hydrocarbon such as carbon tetrachloride or trichloroethylene, or a silicone oil such as polydimethylsiloxane having a suitable viscosity such as a viscosity of about 100 centistokes, or a perfluorocarbon oil, or other types of organic liquids such as aliphatic and aromatic alcohols, glycols, and amino alcohols. Representative useful aliphatic alcohols include isopropanol, 2-butanol, 2-methyl-2-butanol, isobutanol, n-butanol, 2-pentanol, 3-pentanol, 3-hexanol, 4-heptanol, 2-ethyl-1-hexanol, etc. Representative useful aromatic alcohols include particularly the aralkyl alcohols such as benzyl alcohol, 3-methylbenzyl alcohol, 3-phenylpropanol, etc. Generally, the useful alcohols are free of aliphatic unsaturation and have hydroxy substituents on aliphatic carbon atoms, and contain up to 16 carbon atoms. Representative glycols include 1,2-ethanediol, 1,2-propanediol, mixtures of glycerol and ethylene glycol, diethylene glycol, etc. Representative amino alcohol dispersion media include ethanolamine, diethanolamine, triethanolamine, etc.

While not wishing to be bound by theory, it is believed that the improved performance characteristics of the electrodes of the invention result from the improved bonding of the polytetrafluoroethylene to the electrically conductive, hydrophilic, particulate material so as to more adequately wet-proof this particulate material and therefore extend the life of the electrode made utilizing a homogeneous, hydrophilic layer prepared in accordance with the teachings of the invention. Therefore the gaseous porosity of the hydrophilic layer of the composite electrode of the invention can be more effectively maintained during use as a result of the greater wet-proofness of the carbon component of the hydrophilic layer of the electrode.

The thickness of the hydrophilic layer of the electrodes of the invention will normally be within the range of about 5 to about 30 mils, preferably about 10 to about 20 mils, and most preferably about 12 to about 15 mils. However, the thickness of the hydrophilic layer of the electrode of the invention can be varied outside these ranges. It is within the invention to utilize composite electrodes utilizing a hydrophilic layer prepared as described above in conjunction with a current distributor without an additional porous, hydrophobic layer of a hydrophobic polymer as well as the above described three-component composite electrode which includes a hydrophobic, porous backing layer of a hydrophobic polymer.

Although under certain conditions it will be possible to manufacture the hydrophilic layer of the electrodes of the invention by the method described above excluding the use of an organic liquid diluent dispersion medium which functions both as a lubricant and as a pore-forming ingredient, the use of such a diluent dispersion medium is very desirable and facilitates the manufacture of a satisfactory hydrophilic layer. Without the diluent dispersion medium, greater difficulties will usually be encountered in the milling operation as well as other processing operations. In addition to the organic liquid diluent dispersion medium described above, water and other aqueous media have been described in the prior art as useful lubricants or dispersion media for the processing of mixtures of a hydrophobic polymer such as polytetrafluoroethylene and pore-forming particulate solids.

The proportion of dispersion medium, whether it be an organic liquid diluent dispersion medium or water will normally be about 25 to about 50 percent by weight of the total mixture of the hydrophobic polymer, electrically conductive, particulate material, and diluent dispersion medium. Preferably the proportion of dispersion medium will be about 30 to 40 percent by weight, and most preferably about 35 to 40 percent by weight. The dispersion medium is partially removed subsequent to the preparation of the dispersion by filtration and pressing subsequent to dough formation by pressing the filtered mass into a cake for subsequent calendering. Therefore the proportion of lubricant given above refers to that proportion present in the dispersion initially prepared of an electrically conductive, particulate material and a hydrophobic polymer.

After production of a sheet of the hydrophilic layer of the electrode of the invention by the preparation of a dispersion, precipitation of said dispersion, shear blending of the mass obtained and preparation of a cake and calendering into a hydrophilic sheet, the sheet will be laminated to a backing layer and heated to drive off any volatile components thereof. These can include any water, low boiling solvents, and lower boiling portions of the organic liquid diluent dispersion medium lubricant, if so utilized, and any other adjuvants which can be present. The sheet can be thereafter sintered. Initially, heating of the sheet will usually take place at a temperature range of about 100° to 250° C. and will be conducted for a suitable time to effect volatilization, such as about one minute to five hours, preferably about five minutes to about one hour, although by the use of special techniques such as microwave heating, much shorter times can be employed. Thereafter the hydrophilic layer so formed is sintered at a temperature of about 340° C. to 360° C. for the time required to effect sintering of the hydrophilic polymer binder. Usually about 30 minutes to about ten hours is required for sintering unless such heating methods as microwave or ultrasonic heating methods are used. Preferred sintering times are about one to about five hours. The particulate pore-forming material contained in the backing layer is thereafter removed by a suitable process, such as by leaching.

The following examples illustrate the various aspects of the invention but are not intended to limit its scope. Where not otherwise specified throughout this specification and claims, temperatures are given in degrees centigrade, and parts, percentages, and proportions are by weight.

EXAMPLE 1

A composite gas diffusion electrode was prepared by laminating by calendering a hydrophilic layer to a hydrophobic backing layer and laminating a current distributor to the side of the hydrophilic layer opposite to that which is laminated to a hydrophobic backing layer. The current distributor is a silver-plated 50×50×0.005 inch nickel mesh. The hydrophilic layer containing 80 percent by weight of catalyzed carbon and 20 percent by weight of polytetrafluoroethylene was prepared as follows:

A 60 percent by weight solids dispersion of polytetrafluoroethylene sold under the trademark TEFLON ™ 30B in the amount of 100 grams were added to a beaker, together with four liters of deionized water and subsequently cooled to a temperature of 15° C. utilizing a dry ice bath. After stirring the contents of the beaker for one hour, a 2 percent by weight silver catalyzed carbon was added in the amount of 240 grams. Stirring of the contents of the beaker was continued for an additional hour while the temperature was increased from 15° C. to 30° C. The mixture was then filtered and the resultant mass was dried at 150° C. at 16 hours. The mass was broken up to form a fine carbon powder of carbon substantially coated with polytetrafluoroethylene. The powder was mixed with about 2,000 milliliters of a straight-run petroleum naphtha, sold under the tradename VARSOL 3, in order to form a pliable dough. The dough is subsequently pressed into a cake utilizing a press at a pressure of 6,000 psi for a period of four minutes. Thereafter the cake is calendered utilizing successive passes through the calender rolls to prepare a sheet having a thickness of about 12 mils.

A hydrophobic backing layer was prepared as follows:

A granular polytetrafluoroethylene sold under the trademark TEFLON ™ 6 was added in the amount of 357 grams to a blender containing one liter of a straight-run petroleum naphtha sold under the tradename VARSOL 3. These components were blended for about six minutes. Thereafter 833 grams of sodium chloride were added to the blender together with three liters of VARSOL 3. The mixture was blended for an additional six minutes. The dispersion was filtered and the filtrate was formed into a cake by pressing at 2500 psi. Thereafter the cake was calendered by successive passes through the calender rolls to obtain a sheet having a thickness of about 18 mils.

The composite sheet material formed by laminating the above-prepared hydrophilic and hydrophobic layers with a current distributor was thereafter sintered at a temperature of 360° C. for thirty minutes under a nitrogen atmosphere and thereafter the pore-forming material was removed utilizing a deionized water leach. The electrode was air dried prior to testing as an air depolarized cathode in chlor-alkali test electrolyte cells which were filled with sodium hydroxide at a concentration of 150 grams per liter. The cell was operated at 75° C. utilizing a gas pressure against the hydrophobic backing sheet of 2 psi. The electrode sheet material prepared herein was utilized as the cathode together with a nickel anode formed of a mesh having a thickness of 20 mils. In evaluating the performance of the electrode, the operating voltage was checked at each current density noted. Voltage was indicated by reference to a saturated calomel electrode. The table below summarizes the results obtained.

| Operating Time (Days) | TEST DATA - I Current Density (Amps/in$^2$) | Potential (V vs. SCE) |
|---|---|---|
| 1 | 0.5 | −0.38 |
| 4 | 1.5 | −0.42 |
| 18 | 1.5 | −0.58 |
| 31 | 1.5 | −0.71 |
| 80 | 1.5 | −0.75 |
| 119 | 1.5 | −0.89 |
| 149 | 1.5 | −1.40 |
| | (Electrode regenerated) | |
| 156 | 1.5 | −0.61 |
| 180 | 1.5 | −0.62 |
| 210 | 1.5 | −0.62 |
| 239 | 1.5 | −0.80 |
| 249 | 1.5 | −1.47 |

After 149 days operating time, the electrode was regenerated by soaking in distilled water for three hours at ambient temperature and drying for four hours at 110° C. After 249 days operating time, the electrode failed. Regeneration was not tried at this time since the electrode showed signs of cracking.

EXAMPLES 2 AND 3

(Control—forming no part of this invention)

In order to show the importance of sintering as a means of extending the useful life of gas diffusion electrodes, two composite gas diffusion electrodes were prepared. In Example 2 the electrode was sintered at 360° C. in air for thirty minutes, and in Example 3 the electrode was not sintered but merely heated at 150° C. for thirty minutes.

Each of the electrodes were made using catalyzed carbon in combination with polytetrafluoroethylene as the binder. Each of the electrodes contained 80 percent by weight of catalyzed carbon and 20 percent by weight of polytetrafluoroethylene. The active layer of the electrode was formed by first preparing an aqueous dispersion of the activated carbon and polytetrafluoroethylene in accordance with the procedure and proportions of Example 1. An active layer sheet having a thickness of about 10 to 20 mils was obtained. Thereafter the active layer sheet was laminated by calendering to a hydrophobic layer containing a pore-forming material prepared in a similar manner as described in Example 1. The electrodes were dried at elevated temperature to remove volatiles. The electrode of Example 2 was sintered in air at 360° C. for thirty minutes while the electrode of Example 3 was not sintered but merely heated at 150° C. for a similar period of time. The pore-forming material was removed by water leaching. The following test results were obtained for the electrodes when mounted in test cells in a manner similar to that described in Example 1. It is noted that the electrode of Example 3 delaminated between the active layer and the backing layer, while the electrode of Example 2 showed no sign of delamination, thus illustrating the importance of sintering the binder.

| Operating Time (Days) | TEST DATA - II Current Density (Amps/in$^2$) | Potential (V vs. SCE) |
|---|---|---|
| | Example 2 | |
| 1 | 0.5 | −0.35 |

-continued

TEST DATA - II

| Operating Time (Days) | Current Density (Amps/in$^2$) | Potential (V vs. SCE) |
|---|---|---|
| 3 | 1.5 | −0.47 |
| 7 | 1.5 | −0.47 |
| 13 | 1.5 | −0.47 |
| 19 | 1.5 | −0.47 |
| Example 3 | | |
| 1 | 0.5 | −0.43 |
| 3 | 1.5 | −0.83 |
| 7 | 1.5 | −0.89 |
| 13 | 1.5 | −1.05 |
| 19 | (electrode delaminated) | −1.48 |

While this invention has been described with reference to certain specific embodiments, it will be recognized by those skilled in the art that many variations are possible without departing from the scope and spirit of the invention, and it will be understood that it is intended to cover all changes and modifications of the invention disclosed herein for the purposes of illustration which do not constitute departures from the spirit and scope of the invention.

The embodiments of the invention in which an exclusive property or privilege is claimed are defined as follows:

1. A gas diffusion composite electrode useful in an electrochemical cell, comprising an electrochemically active layer and a backing layer, said active layer characterized as porous, homogeneous, hydrophilic, and electrolyte-permeable and comprising a sintered mixture of a major amount of an electrically conductive, hydrophilic, particulate material containing admixed therewith an electrochemically active catalyst, and a minor amount of a hydrophobic polymer, said particulate material being substantially coated with said hydrophobic polymer by precipitation of said hydrophobic polymer upon said particulate material.

2. The electrode of claim 1 wherein said hydrophobic polymer is present in an amount of about 1 to about 20 percent by weight and said sintering takes place in a nitrogen atmosphere.

3. The electrode of claim 2 wherein said hydrophobic polymer comprises a thermoplastic halocarbon polymer selected from the group consisting of at least one of polymers of tetrafluoroethylene, fluorinated ethylene propylene, copolymers thereof having the moieties
(—CX$_1$X$_2$—CX$_3$CX$_4$—) and
(—CY$_1$Y$_2$—CY$_3$Y$_4$—), and
homopolymers having the moieties (—CY$_1$Y$_2$—CY$_3$F—)
wherein X$_1$, X$_2$, X$_3$, X$_4$, Y$_1$, Y$_2$, Y$_3$, and Y$_4$ are selected from the group consisting of fluorine, chlorine and hydrogen, at least one of said X and Y being fluorine.

4. The electrode of claim 3 wherein said thermoplastic halocarbon polymer comprises a fluorocarbon polymer selected from the group consisting of at least one of copolymers having an ethylene moiety and a fluorocarbon moiety chosen from the group consisting of
(—CFH—CH$_2$—),
(—CF$_2$—CH$_2$—),
(—CF$_2$—CFH—),
(—CF$_2$—CF$_2$—), and
(—CF$_2$—CClF—).

5. The electrode of claim 4 wherein said fluorocarbon polymer is polytetrafluoroethylene.

6. The electrode of claim 4 wherein said electrically conductive, hydrophilic particulate material is present in the amount of about 80 to about 99 percent by weight and comprises carbon black, said electrode is a cathode, and said electrochemically active catalyst comprises a precious metal catalyst.

7. The electrode of claim 6 wherein said electrochemically active catalyst is selected from the group consisting of platinum, silver, palladium, and rhodium.

8. A method for the preparation of a gas diffusion composite electrode comprising an electrolyte-permeable, homogeneous polymer active layer, a backing layer, and a current distributor comprising the steps of:
(A) preparing an electrochemically active material dispersion consisting essentially of a liquid dispersion medium, a hydrophobic polymer and a major amount of an electrically conductive, hydrophilic, particulate material containing admixed therewith an electrochemically active catalyst;
(B) precipitating said hydrophobic polymer upon said particulate material from aid dispersion and removing enough of said dispersion medium to obtain a dry precipitate;
(C) drying the precipitate obtained to remove substantially all of said dispersion medium;
(D) mixing the dried precipitate with a liquid dispersion medium to produce a cohesive and pliable dough;
(E) subjecting the dough to a fibrillation step in which the dough is shear-blended and thereafter calendering said dough to form an electrolyte-permeable polymer layer;
(F) laminating said electrolyte-permeable polymer layer to a current distributor and a backing layer comprising a hydrophobic polymer and a pore-forming material;
(G) sintering said layers; and
(H) removing said pore-forming material.

9. The method of claim 8 wherein said hydrophobic polymer is present in said dispersion in the amount of about 1 to about 20 percent by weight and comprises a hydrophobic, thermoplastic halocarbon polymer, said electrically conductive, hydrophilic, particulate material comprises carbon black, said liquid dispersion medium is selected from the group consisting of an organic liquid and an aqueous liquid and said sintering takes place under a nitrogen atmosphere.

10. The method of claim 9 wherein said halocarbon polymer is selected from the group consisting of polymers of tetrafluoroethylene, fluorinated ethylene propylene, and copolymers thereof having the moieties
(—CX$_1$X$_2$—CX$_3$CX$_4$—) and
(—CY$_1$Y$_2$—CY$_3$Y$_4$—), and
homopolymers having the moieties (—CY$_1$Y$_2$—CY$_3$F—)
wherein X$_1$, X$_2$, X$_3$, X$_4$, Y$_1$, Y$_2$, Y$_3$, and Y$_4$ are selected from the group consisting of fluorine, chlorine and hydrogen, at least one of said X and Y being fluorine.

11. The method of claim 10 wherein said halocarbon polymer comprises a fluorocarbon polymer selected from the group consisting of at least one of copolymers having an ethylene moiety and a fluorocarbon moiety chosen from the group consisting of
(—CFH—CH$_2$—),
(—CF$_2$—CH$_2$—),
(—CF$_2$—CFH—),
(—CF$_2$—CF$_2$—), and
(—CF$_2$—CClF—).

12. The method of claim 11 wherein said fluorocarbon polymer is polytetrafluoroethylene, said electrochemically active catalyst is a precious metal catalyst selected from the group consisting of platinum, silver, palladium, and rhodium and said current distributor is a silver-plated nickel mesh.

13. An electrochemically active layer of a composite gas diffusion electrode useful as an electrode in an electrochemical cell, said layer characterized as porous, homogeneous, hydrophilic, and electrolyte-permeable comprising a sintered mixture of a major amount of an electrically conductive, hydrophilic, particulate material containing admixed therewith an electrochemically active catalyst and substantially coated with a minor amount of a hydrophobic polymer precipitated upon said particulate mateial.

14. The electrochemically active layer of claim 13 wherein said hydrophobic polymer is present in the amount of about 1 to about 20 percent by weight and wherein sintering takes place under a nitrogen atmosphere.

15. The electrochemically active layer of claim 14 wherein said hydrophobic polymer comprises a thermoplastic halocarbon polymer selected from the group consisting of at least one of polymers of tetrafluoroethylene, fluorinated ethylene propylene, copolymers thereof having the moieties
($-CX_1X_2-CX_3CX_4-$) and
($-CY_1Y_2-CY_3Y_4-$), and
homopolymers having the moieties ($-CY_1Y_2-CY_3F-$)
wherein $X_1$, $X_2$, $X_3$, $X_4$, $Y_1$, $Y_2$, $Y_3$, and $Y_4$ are selected from the group consisting of fluorine, chlorine and hydrogen, at least one of said X and Y being fluorine.

16. The electrochemically active layer of claim 15 wherein said thermoplastic halocarbon polymer comprises a fluorocarbon polymer selected from the group consisting of at least one of copolymers having an ethylene moiety and a fluorocarbon moiety chosen from the group consisting of
($-CFH-CH_2-$),
($-CF_2-CH_2-$),
($-CF_2-CFH-$),
($-CF_2-CF_2-$), and
($-CF_2-CClF-$).

17. The electrochemically active layer of claim 15 wherein said fluorocarbon polymer is polytetrafluoroethylene, said electrically conductive, hydrophilic particulate material is present in the amount of about 80 to about 99 percent by weight and comprises carbon black, said electrode is a cathode, and said electrochemically active catalyst is a precious metal catalyst.

18. The electrochemically active layer of claim 17 wherein said catalyst is selected from the group consisting of platinum, silver, palladium, and rhodium.

19. A method for the preparation of an electrolyte-permeable, homogeneous polymer sheet useful as the electrochemically active layer of a composite gas diffusion electrode useful in an electrochemical cell, comprising the steps of:

(A) preparing an electrochemically active material dispersion consisting essentially of a liquid dispersion medium, a hydrophobic polymer and a major amount of an electrically conductive, hydrophilic, particulate material containing admixed therewith an electrochemically active catalyst;

(B) precipitating said hydrophobic polymer upon said particulate material and removing enough of said dispersion medium to obtain a dry precipitate;

(C) drying the precipitate obtained to remove substantially all of said dispersion medium;

(D) mixing the precipitate obtained in (B) with a liquid dispersion medium to produce a cohesive and pliable dough;

(E) subjecting the dought to a fibrillation step in which the dough is shear-blended and thereafter calendering said dough to form said electrolyte-permeable polymer sheet; and (F) sintering said polymer sheet.

20. The method of claim 19 wherein said hydrophobic polymer is present in said dispersion in the amount of about 1 to about 20 percent by weight and comprises a hydrophobic, thermoplastic halocarbon polymer, said electrically conductive, hydrophilic, particulate material comprises carbon black, said liquid dispersion medium is selected from the group consisting of an organic liquid and an aqueous liquid and sintering takes place under a nitrogen atmosphere.

21. The method of claim 20 wherein said halocarbon polymer is selected from the group consisting of polytetrafluoroethylene, fluorinated ethylene propylene, and copolymers thereof having the moieties
($-CX_1X_2-CX_3CX_4-$) and
($-CY_1Y_2-CY_3Y_4-$), and
homopolymers having the moieties ($-CY_1Y_2-CY_3F-$)
wherein $X_1$, $X_2$, $X_3$, $X_4$, $Y_1$, $Y_2$, $Y_3$, and $Y_4$ are selected from the group consisting of fluorine, chlorine and hydrogen, at least one of said X and Y being fluorine.

22. The method of claim 21 wherein said halocarbon polymer comprises a fluorocarbon polymer selected from the group consisting of at least one of copolymers having an ethylene moiety and a fluorocarbon moiety chosen from the group consisting of
($-CFH-CH_2-$),
($-CF_2-CH_2-$),
($-CF_2-CFH-$),
($-CF_2-CF_2-$), and
($-CF_2-CClF-$).

23. The method of claim 22 wherein said fluorocarbon polymer is polytetrafluoroethylene, said electrochemically active catalyst is a precious metal catalyst selected from the group consisting of platinum, silver, palladium, and rhodium and said current distributor is a silver-plated nickel mesh.

* * * * *